Figure 1:
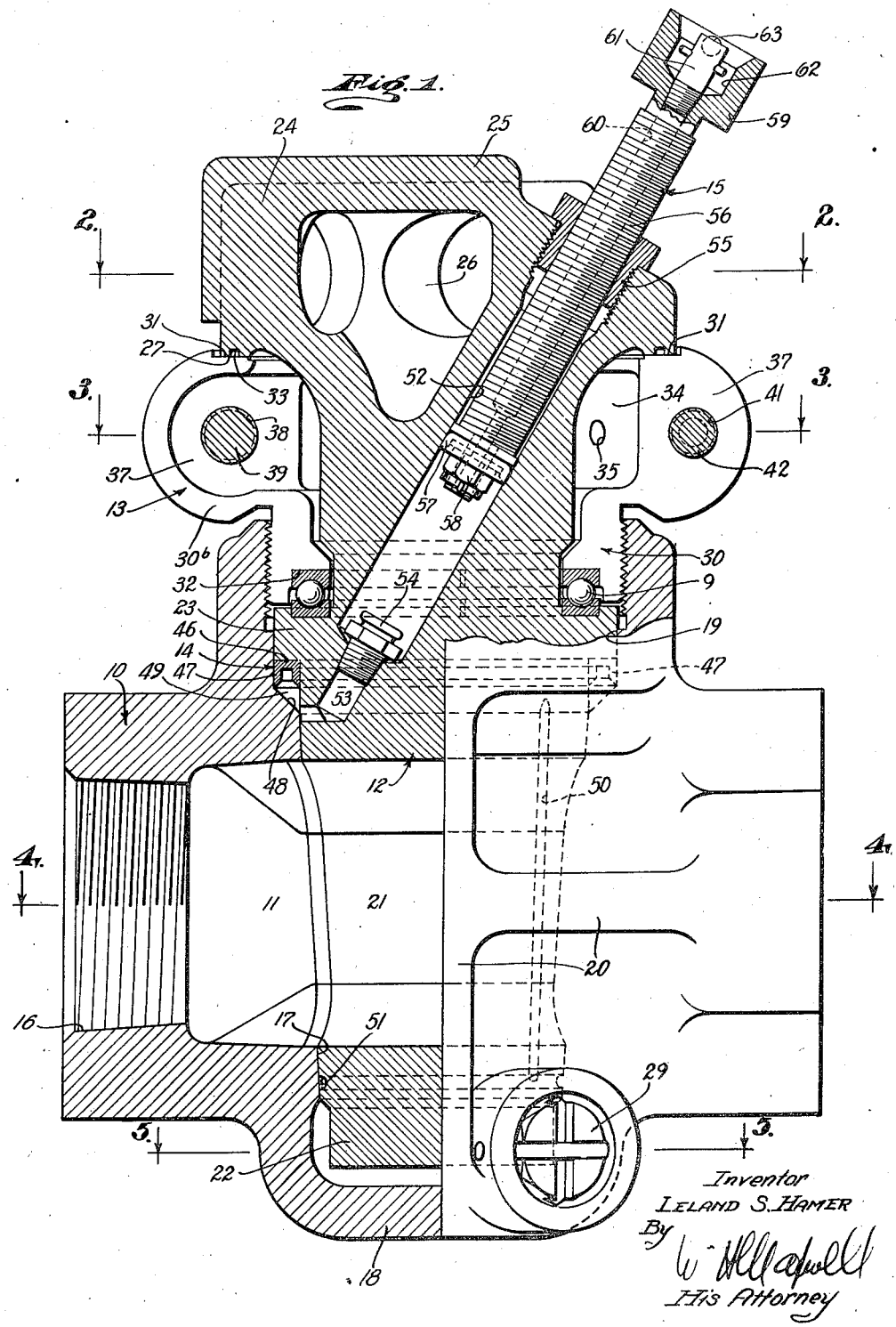

Feb. 16, 1937.  L. S. HAMER  2,070,899

VALVE

Filed Dec. 10, 1934  3 Sheets—Sheet 2

Inventor
LELAND S. HAMER
By
His Attorney

Inventor
LELAND S. HAMER
By
His Attorney

Patented Feb. 16, 1937

2,070,899

UNITED STATES PATENT OFFICE 2,070,899

VALVE

Leland S. Hamer, Long Beach, Calif., assignor to Hamer Oil Tool Company, Long Beach, Calif., a corporation of California Application December 10, 1934, Serial No. 756,819

14 Claims. (Cl. 251—93)

This invention relates to valves and relates more particularly to plug valves or stop cocks. A general object of the invention is to provide a practical, effective plug valve or stop cock that is capable of handling fluid under high pressures and that is easy to operate.

There have been many attempts to provide a plug valve or stop cock that is capable of handling fluid under high pressures without leaking and that is easy and convenient to open and close. Stop cocks wherein packing material is employed to seal about the plug are not altogether satisfactory because the packing material cuts away under high pressures and leaks and resists turning of the plug when the plug is forced into the valve opening to prevent such leakage. Plug valves or stop cocks have been introduced having screws or similar means for forcing the tapered plug into the valve body opening to prevent leakage about the plug. The flow controlling plugs of the last mentioned class of valves often become so tightly set or locked that it is very difficult and sometimes impossible to turn them.

Another object of the invention is to provide a plug valve or stop cock that is capable of handling fluid under very high pressures without leakage and in which the flow controlling plug may be easily turned under any pressure conditions.

Another object of the invention is to provide a stop cock in which the plug may be forced into the body opening as tightly as pressure conditions may require and may thereafter be instantly freed for easy turning.

Another object of the invention is to provide a plug valve or stop cock embodying a single, simple means or part for forcing the plug into the body under various pressures as conditions may require, and for loosening or freeing the plug so that it may be easily turned between its open and closed positions.

Another object of the invention is to provide a stop cock of the character mentioned in which the plug may be set or locked against movement in the body opening when under very heavy inward pressures or under any degree of pressure as may be necessary.

Another object of the invention is to provide a stop cock of the character mentioned in which the plug may be lubricated to provide a liquid seal and to provide for the easy turning of the plug.

Another object of the invention is to provide an improved stop cock of the character mentioned embodying a fluid pressure actuated sealing means that may be made operative by the lubricant under pressure which lubricates the plug.

Another object of the invention is to provide a stop cock in which the lubricant under pressure for lubricating the plug and for actuating the sealing means may be supplied from an external source such as a grease gun or the like, or the lubricant may be put under pressure in a chamber in the plug by the operation of a plunger on the plug.

A further object of the invention is to provide a stop cock of the character mentioned in which the means for urging or forcing the plug into the body opening and for raising or freeing the plug may be readily lubricated.

Figure 2:
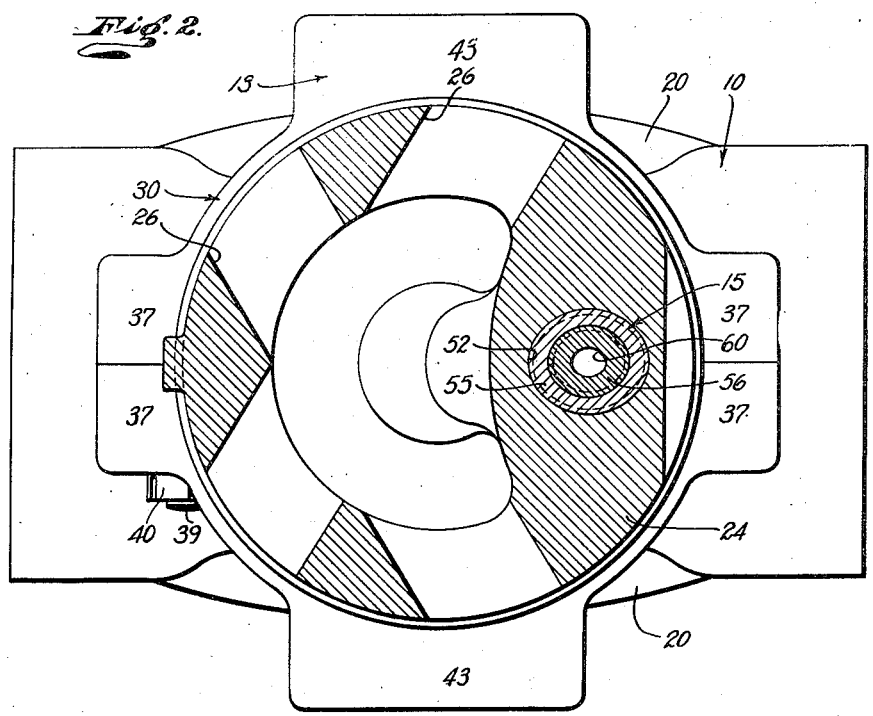
Figure 3:
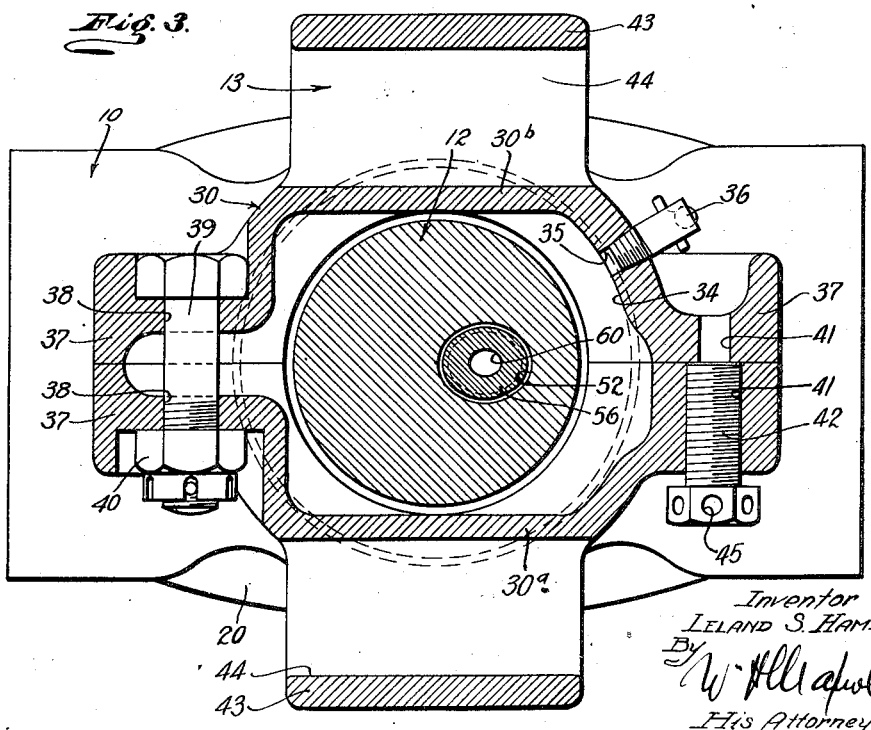
Figure 4:
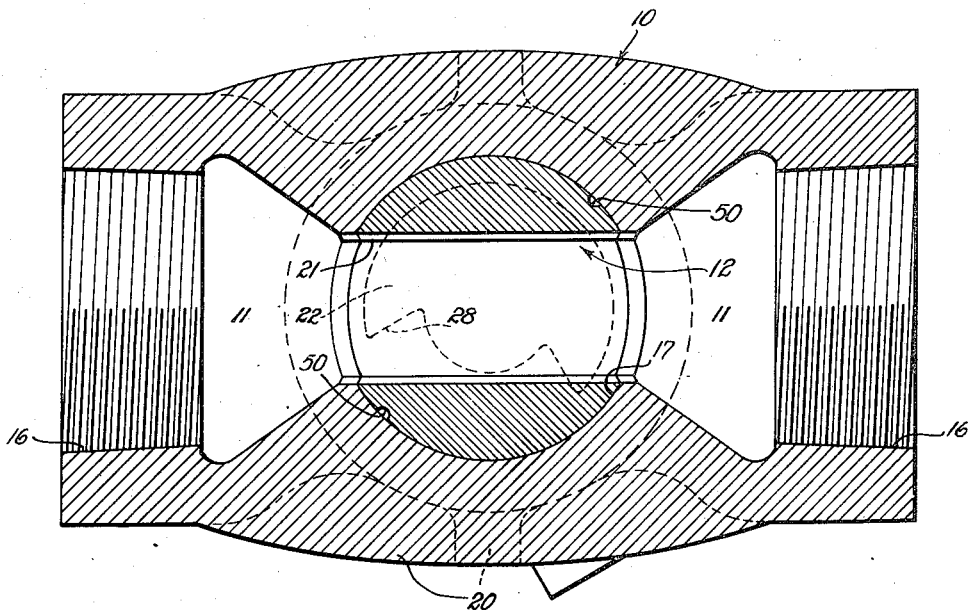
Figure 5:
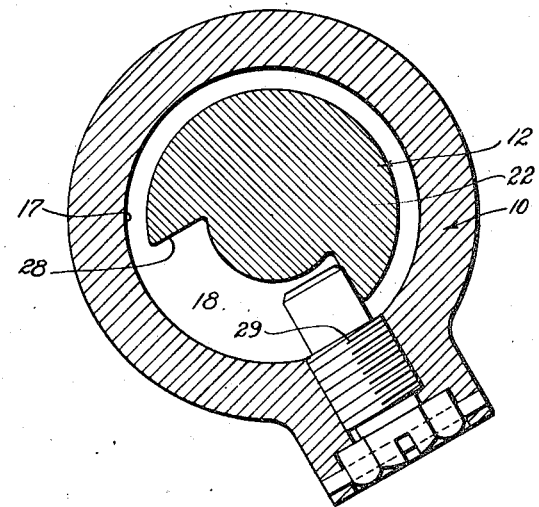

The various objects and features of my invention will be fully understood from the following detailed description of a typical form and application of my invention, throughout which description reference is made to the accompanying drawings, in which:

Fig. 1 is a vertical or longitudinal detailed sectional view of the valve provided by the present invention with a portion of the body in side elevation. Figs. 2 and 3 are transverse detailed sectional views taken as indicated by lines 2—2 and 3—3, respectively, on Fig. 1, and Figs. 4 and 5 are transverse detailed sectional views taken as indicated by lines 4—4 and 5—5 on Fig. 1.

The plug valve or stop cock of the present invention includes, generally, a body 10 having a fluid passage 11, a plug 12 for controlling the flow through the passage, means 13 for forcing the plug 12 into the body to prevent the leakage of fluid from about the same, and operable to loosen or free the plug for easy turning, a sealing ring 14 for sealing between the plug 12 and body 10 and means 15 for lubricating the plug 12 and for actuating the sealing ring 14.

The body 10 is adapted to be interposed in a pipe line being provided at its opposite ends with suitable means for connecting it with pipes or the like. In the particular embodiment of the invention illustrated in the drawings the opposite end portions 16 of the passage 11 are screw threaded for the reception of nipples or pipe parts. The fluid passage 11 extends through the body from one end to the other and its intermediate portion may be vertically or transversely elongated as clearly illustrated in Figs. 1 and 4 of the drawings. An opening 17 extends into what I will term the upper end of the body 10 and intersects the fluid passage 11. The opening 17 is provided to carry the plug 12 and its major portion is tapered inwardly and downwardly. The plug carrying opening 17 is round in transverse cross section and its longitudinal axis is preferably normal to the longitudinal axis of the fluid passage 11. An integral and imperforate wall 18 of the body 10 closes the lower end of the opening 17. The upper or outer portion 19 of the opening 17 is of enlarged diameter and has a cylindrically curved wall. The walls of the body 10 are preferably comparatively thick and are reinforced by crossed or joined reinforcing ribs 20.

The plug 12 is arranged in the body opening 17 and is operable to control or cut off the flow of fluid through the body passage 11. The plug 12 is an elongate member whose major or principal portion is tapered and of round cross section to fit the opening 17. In practice the plug 12 may be lapped or ground directly in the opening 17 to insure the perfect even cooperation of its surface with the wall of the opening 17. The plug 12 is provided with a transverse opening 21 which is adapted to register with the fluid passage 11 when the plug 12 is in its open position. The opening 21 may be of the same configuration and capacity as the intermediate portion of the fluid passage 11. The inner end portion 22 of the plug 12 may be reduced in diameter and may be cylindrical. The plug portion 22 and the lower end of the plug 12 have substantial clearance with the adjacent internal surfaces of the body 10. The plug 12 is provided with a cylindrical annular flange 23 which operates in or slidably fits the cylindrical portion 19 of the body opening. The plug 12 projects upwardly or outwardly from the body 10 and is provided at its outer end with a head 24.

The head 24 may be cylindrical in its general configuration and may have a diametric rib 25 extending across its top and side to indicate the rotative position of the plug 12. In accordance with the invention the head 24 is provided with one or more horizontal or transverse openings 26 to receive a crowbar or other tool for turning the plug. In the preferred construction illustrated in the drawings there are two crossed or intersecting openings 26 whereby the plug may be conveniently turned when in different rotative positions. The openings 26 preferably intersect at a point spaced from the central longitudinal axis of the plug 12. A rod, crowbar, or other tool is adapted to be arranged in either one of the openings 26 for the purpose of turning the plug 12, it being a feature of the invention that heavy turning forces may be applied to the plug in this manner, and it is never necessary to hammer or jar the plug.

In accordance with the invention the head 24 is spaced a considerable distance above the upper end of the body 10 and its lower end forms a downwardly facing shoulder 27 on the projecting portion of the plug 12. The shoulder 27 is flat and normal to the longitudinal axis of the plug. Means is provided for stopping or limiting the turning of the plug 12 at its full open and closed positions. An arcuate or circumferentially extending groove 28 is provided in the lower portion 22 of the plug. A stop screw 29 is threaded through a transverse opening in the side wall of the body 10 and its inner end portion is received in the groove 28. It will be apparent that the end walls of the groove 28 are adapted to contact the screw 29 to stop the plug in its open and closed positions. The stop screw 29 may be locked against displacement as illustrated in the drawings.

The means 13 for urging or forcing the plug 12 into the body opening 17 to tightly seal with its walls and for raising or freeing the plug for easy turning is a feature of the invention. The means 13 is such that the plug 12 may be urged into the opening 17 under pressures which prevent the leakage of fluid but which allow the plug to be turned. In some instances the means 13 may be operated to force the plug 12 into the opening 17 under a very heavy pressure to prevent the leakage of fluid when the valve is handling fluid under high pressures. The means 13 is adapted to be set or locked after being adjusted to maintain the desired inward pressure on the plug 12. It is particularly significant that the means 13 is capable of freeing the plug 12 for easy turning regardless of the inward pressure that has been exerted on it and regardless of how long the plug has remained set without being operated.

The means 13 includes what I will term a nut 30 interposed between the flange 23 and the shoulder 27 of the plug 12. The nut 30 is screw threaded into the outer portion of the body opening 17, the threads on the nut and the wall of the opening being comparatively heavy. A flat normal and accurately machined surface 31 is provided on the upper end of the nut 30 to cooperate with the shoulder 27. A similar flat normal downwardly facing surface 32 is provided on the lower end of the nut. An anti-friction bearing 9 may be arranged between the surface 32 and the flat upper end of the flange 23. The bearing 9 may be split or sectional so that it may be readily assembled around the plug 12. The nut 30 is proportioned so that its surfaces 31 and 32 properly bear on or cooperate with the shoulder 27 and bearing 9 to allow relative turning between the nut and plug. A lubricant groove or sealing groove 33 may be provided in the shoulder 27. If desired or found necessary an anti-friction bearing may be interposed between the shoulder 27 and the surface 31. The nut 30 is hollow or provided with an internal chamber 34 for receiving and holding a lubricant. A port 35 is provided in the wall of the nut 30 to communicate with the chamber 34 and is provided with a suitable valved fitting 36 whereby lubricant may be supplied to the chamber by a grease gun or lubricating device. The lubricant in the chamber 34 operates to lubricate the threads of the nut 30 and body 10 and the cooperating surfaces of the nut and plug 12.

In accordance with the invention the nut 30 is diametrically split into two like or complementary sections 30$^a$ and 30$^b$. In the process of splitting or cutting the nut 30 into two sections it is preferred to remove a considerable amount of material of the nut. The sections 30$^a$ and 30$^b$ have opposing pairs of lugs or wings 37 at the line of division or separation of the nut. Aligned transverse openings 38 are provided in one pair of wings 37 to receive a screw 39. A nut 40 is threaded on an end of the screw 39 to clamp the nut sections 30$^a$ and 30$^b$ together. The opposing inner surfaces of the sections 30$^a$ and 30$^b$ are flat and machined to accurately or closely fit one against the other. The head of the screw 39 and the nut 40 are preferably countersunk in the wings 37. The nut 40 is preferably castellated and keyed as illustrated in Fig. 3 of the drawings. As initially or normally assembled the sections 30$^a$ and 30$^b$ of the nut 30 are tightly clamped together. The pair of wings 37, diametrically opposite the wings 37 carrying the screw 39, are provided with aligned openings 41. An adjusting or locking screw 42 is threaded through one opening 41 and its end is adapted to react against the inner surface of the opposing wing 37 to spread the nut sections 30ᵃ and 30ᵇ. The opening 41 in the said opposing wing 37 is of less diameter than the screw 42.

In manufacturing the nut 30 its several openings may be drilled and reamed before splitting or dividing it into the sections 30ᵃ and 30ᵇ. After splitting or cutting the nut 30 its sections 30ᵃ and 30ᵇ are clamped together by the screw 39 and a screw passed through the openings 41 and the nut is then machined and provided with the thread for cooperating with the thread in the body opening 17. When made in this manner the nut 30 has proper cooperation with the body 10 and plug 12 and is adapted to be spread or expanded and locked in position by a slight turning of the screw 42. The sections 30ᵃ and 30ᵇ are each provided with a lug or wing 43 projecting outwardly beyond the head 24 and the adjacent portions of the body 10. Tangential or horizontal openings 44 extend through the wings 43 to receive a crowbar or the like for turning the nut 30.

With its sections 30ᵃ and 30ᵇ tightly clamped together by the screw 39 the nut 30 may be threaded outwardly to free the plug 12 for easy turning. After turning of the plug to the desired position the nut 30 may be threaded inwardly or downwardly to force the plug 12 into the opening 17. It is to be understood that the plug 12 may be forced inwardly under any pressure as conditions may require to maintain its surface in tight sealing engagement with the wall of the tapered opening 17. In some instances it may be preferred to thread the nut 30 inwardly to a position where the plug 12 tightly seals with the wall of the opening 17 and yet may be turned between its open and closed positions without undue effort. In other instances it may be preferred to thread the nut 30 inwardly to tightly set the plug 12 so that the engagement of its surface with the wall of the opening 17 positively prevents the leakage of fluid under high pressures and after having set the plug in this manner the nut may be locked against turning by inward threading of the lock screw 42. The lock screw 42 spreads the nut sections 30ᵃ and 30ᵇ so that their thread tightly binds against the thread of the body 10 and prevents turning of the nut. The head of the screw 42 may be provided with openings 45 to receive a lock or other device for locking the screw in position. When it becomes necessary or desirable to raise or free the plug 12 for turning the screw 42 is loosened and the nut 30 is threaded outwardly to react against the shoulder 27 and thus raise or free the plug.

The sealing ring 14 may be embodied in the valve or stop cock to seal between the plug 12 and the wall of the body opening 17 above the fluid passage 11. The sealing ring 14 is actuated or made operative by fluid pressure and may be actuated by fluid pressure leaking outwardly around the plug 12 to constitute an auxiliary seal or when the valve is provided with the lubricating means 15 the ring 14 may be actuated by the lubricant under pressure supplied by the means 15. The fluid pressure actuated sealing ring 14 is an annular or continuous member of leather, rubber, or metal. The ring 14 is substantially U-shaped in transverse cross section, having an upper inwardly projecting flange 46 and spaced inner and outer cylindrical portions 47. The flange 46 of the sealing ring is adapted to bear and seal upwardly against the lower end of the flange 23 while the portions 47 are adapted to seal outwardly against the wall of the cylindrical portion 19 of the body opening and inwardly against the plug 12. An upwardly and outwardly inclined annular surface 48 connects the major tapered portion 17 of the body opening with the cylindrical portion 19, and as the adjacent part of the plug 12 is cylindrical a substantial annular groove or space 49 is left in the opening 19 to carry the sealing ring 14. The lower ends of the sealing ring portion 47 are preferably bevelled. The sealing ring 14 is adapted to seal outwardly against the wall of the opening portion 19, inwardly against the plug 12, and upwardly against the flange 23 to prevent the leakage of fluid outwardly around the plug 12.

The means 15 for lubricating the plug 12 may be omitted or dispensed with when the valve is intended to handle fluids that are contaminated by lubricants in a valve. However, it is preferred to embody the lubricating means 15 in the valve so that it may be used when practical, it being apparent that where easily contaminated fluids are handled the lubricating means need not be operated or charged with lubricant. Two or more longitudinal lubricant grooves 50 are provided in the tapered surface of the plug 12. The grooves 50 extend downwardly from points above the inclined surface 48 to an annular lubricant groove 51 in the plug 12 spaced below the fluid passage 11. The longitudinal lubricant grooves 50 are preferably spaced at the rear of the opening 21, relative to the direction of opening turning movement of the plug 12, so that they are never brought into communication with the fluid passage 11. When the grooves 50 are located in this manner very little, if any, lubricant is lost in the fluid passage 11.

The means 15 is operable to supply lubricant under pressure to the groove 49 and the grooves 50 and 51. An opening 52 extends into the plug 12 from the upper end of its head 25. The opening 52 is in the nature of a lubricant reservoir and pressure chamber and is preferably inclined as illustrated in Fig. 1 of the drawings. The opening 52 is comparatively long and of substantial diameter to contain an ample supply of lubricant. A port 53 connects the lower end of the opening 52 with the space or groove 49. A suitable check valve 54 is provided in the port 53 to admit lubricant under pressure to the groove 49 and prevent a reverse or return flow. A bushing or gland 55 is threaded in the outer portion of the opening 52. A screw plunger or threaded plunger 56 is threaded through the gland 55 and extends into the opening 52 with suitable clearance. A packing or cup leather 57 is provided on the inner end of the plunger 56 for sealing with the wall of the opening 52. A nut 58 may be threaded on the plunger 56 to retain the cup leather 57 in position. The plunger 56 has a long thread whereby it may be threaded a considerable distance into the opening 52 to displace or force the lubricant under pressure into the groove 49. It will be understood how the lubricant under pressure is forced into the groove 49, the grooves 50 and the annular lower groove 51. A square or flat sided head 59 is provided on the projecting outer end of the plunger 56 to facilitate the turning or operating of the plunger.

In accordance with the invention lubricant may be readily delivered or supplied to the opening 52 without removing the plunger 56 and may be forced into the opening 52 under pressure to effectively lubricate the plug 12 and actuate the sealing ring 14. The plunger 56 is tubular, being provided with a longitudinal opening 60 which extends through it from one end to the other. A grease gun fitting 61 is provided in the outer end of the opening 60 whereby lubricant may be forced through the opening 60 into the opening 52 from a grease gun or other lubricating device. The fitting 61 has the usual check valve 63 for preventing a reverse or outward discharge of grease. The head 59 is preferably provided with a socket 62 for receiving the fitting 61. The lubricant under pressure may be forced into the chamber or opening 52 from a grease gun or lubricating device to lubricate the plug 12 and actuate the sealing ring 14 and the plunger 56 may be threaded inwardly from time to time to maintain the required pressure on the lubricant.

It is believed that the operation of the valve or stop cock will be readily understood from the foregoing detailed description. When the valve is handling fluid under high pressures it may be preferred or necessary to thread the nut 30 downwardly to force the plug 12 inwardly so that its surface tightly seals with the wall of the tapered opening 17 to prevent the leakage of fluid from around the plug. It will be understood that the plug may be forced inwardly under the desired or necessary pressures when in the open position, closed position, or an intermediate position. When it is desired to turn the flow controlling plug 12 a crowbar or the like may be passed through an opening 26 and the operator may apply the required force to the bar to turn the plug. In the event that the plug has become set in the opening 17 or is held inwardly under a heavy pressure by the nut 30 it may be necessary to thread the nut 30 outwardly to shift the plug outwardly and free it for easy turning. The openings 44 for receiving a crowbar or the like facilitate the easy threading of the nut 30. After the plug 12 has been turned to the desired position the nut 30 may be threaded inwardly to tightly force the plug 12 into the opening 17 to positively prevent the leakage of fluid from around the plug. If desired the nut 30 may be locked in the adjusted or set position by threading the screw 42 inwardly. A suitable padlock or the like may be passed through an opening 45 or be engaged with the screw 42 to prevent anyone from opening or tampering with the valve.

It will be understood how inward threading of the screw 42 spreads the nut sections 30ᵃ and 30ᵇ to tightly lock the nut against rotation. The nut 30 may be threaded inwardly to exert various pressures on the plug 12 and, therefore, may be adjusted to adapt the valve for the handling of fluid under various pressures. In some instances it may be practical to adjust the nut 30 to a position where it exerts an inward pressure on the plug 12 sufficient to prevent leakage but which allows the plug 12 to be turned between its open and closed positions. As the nut 30 may be threaded inwardly to exert very heavy inward pressure on the plug 12 the valve is capable of handling fluid under extremely high pressures without leaking. Crowbars or other tools of substantial length may be inserted in the openings 26 and 44 whereby the plug 12 and the nut 30 may be easily turned independently of one another and under any operating conditions so that it is never necessary to hammer or strike either the plug or nut. The threads of the body 10 and nut 30 and the contacting surfaces of the nut 30 and plug 12 are lubricated by the lubricant in the chamber 34 and, therefore, the nut is easy to turn. It will be understood how the nut 30 may be threaded outwardly to easily and quickly free the plug 12 for turning regardless of the inward pressure that may have been exerted on the plug and regardless of the period that the plug may have been set in the opening 17. The nut 30 constitutes a simple, conveniently operated means for forcing the plug into tight sealing engagement with the wall of the body opening 17 and for freeing the plug for ready turning.

When the character of the fluid handled by the valve or stop cock permits, the lubricant may be supplied to the opening 52 by a grease gun or other device which may be connected with the fitting 61. When the grease gun is capable of developing sufficient pressure the lubricant may be forced into the opening 52 to fully pack or supply the groove 49 and the lubricant grooves 50 and 51. This, of course, lubricates the plug 12 and actuates the sealing ring 14. The plunger 56 may be threaded inwardly from time to time as conditions may require to renew the pressure on the lubricant. In the event that a lubricating device or grease gun is not available the plunger 56 may be removed and the opening filled or supplied with lubricant. The plunger may then be threaded into the opening 52 to place the lubricant under the required pressure.

The present invention provides a stop cock in which the plug may be easily turned or operated under any pressure conditions and may be easily set or forced inwardly under sufficient pressure to positively prevent the leakage of fluid from around the plug. The valve or stop cock does not involve packing that is quickly cut out by the fluid under pressure or that is mutilated by turning of the plug. Further, the means 13 for forcing the plug 12 into and out of its opening 17 is extremely simple and does not necessitate the provision of openings in the body 10 from which fluid may leak.

Having described only a typical form and application of my invention, I do not wish to be limited or restricted to the specific form and application herein set forth, but wish to reserve to myself any modifications or variations that may appear to those skilled in the art or fall within the scope of the following claims:

Having described my invention, I claim:

1. A stop cock including a body having a fluid passage and an opening intersecting the passage, a turnable plug in the opening for controlling the flow through the passage, the plug having spaced faces, a split nut threaded in the opening adapted to cooperate with said faces to force the plug into and out of the opening, and a screw threaded in an opening in one section of the nut operable to engage the other section of the nut to expand the nut against the wall of the opening and lock it in a selected position.

2. A stop cock including a body having a fluid passage and an opening intersecting the passage, a turnable plug in the opening for controlling the flow through the passage, a threaded member operable to shift the plug longitudinally in both directions, and means for locking the member in a position where it maintains an inward force on the plug whereby the plug may be turned without unintentionally tightening or loosening the said member.

3. A valve including a body having a fluid passage and an opening intersecting the passage, a tapered plug in the opening for controlling the flow through the passage, a split nut threaded to the body and operable to force the plug into the opening, the nut comprising two connected sections and means for moving the sections of the split nut relative to one another to lock the nut against turning.

4. A valve including a body having a fluid passage and an opening intersecting the passage, a tapered plug in the opening for controlling the flow through the passage, the plug having oppositely facing shoulders, a split nut threaded in the opening and adapted to cooperate with the shoulders to shift the plug longitudinally, and means for expanding the split nut to lock it in the opening.

5. A valve including a body having a fluid passage and an opening intersecting the passage, a tapered plug in the opening for controlling the flow through the passage, a split nut threaded into an end of said opening and associated with the plug to shift the same upon being turned, and means for expanding the split nut against the wall of the opening to lock the nut against turning.

6. A valve including a body having a fluid passage and an opening intersecting the passage, a tapered plug in the opening for controlling the flow through the passage, a nut threaded into an end of the opening and having shouldered engagement with the plug to shift the same longitudinally, the nut comprising two connected sections whereby it is expansible, and means for expanding the nut to lock the same against movement, said means comprising a screw for spreading the sections.

7. A stop cock including a body having a fluid passage and an opening intersecting the passage, a turnable plug in the opening for controlling the flow through the passage, an operating head on the plug overhanging an end of the opening, a nut threaded in the opening and having cooperation with the head and shouldered engagement with the plug to shift the plug longitudinally upon being turned, and an operating part on the nut projecting outwardly beyond the head to be accessible for engagement.

8. A stop cock including a body having a fluid passage and an opening intersecting the passage, a turnable plug in the opening for controlling the flow through the passage, an integral head on the outer end of the plug formed for engagement by a tool for turning the plug, an outwardly facing shoulder on the plug, and a nut between the head and shoulder to cooperate therewith and threaded to the body to shift the plug longitudinally.

9. A stop cock including a body having a fluid passage and an opening intersecting the passage, a turnable plug in the opening for controlling the flow through the passage, a head on the outer end of the plug, an outwardly facing shoulder on the plug, a nut threaded into the opening between the head and the shoulder and adapted to have axial movement transmitting cooperation with the head and shoulder to shift the plug, the nut being split into two sections, and means for forcing the sections outwardly to set the nut and plug against movement.

10. A stop cock including a body having a fluid passage and an opening intersecting the passage, a turnable plug in the opening for controlling the flow through the passage, shoulders on the plug, a nut threaded into the opening adapted to cooperate with the shoulders to shift the plug longitudinally, the nut surrounding the plug with clearance to leave a lubricant chamber in the nut whose ends directly deliver lubricant to the cooperating surfaces of the nut and the two shoulders, and means for supplying lubricant to said chamber.

11. A valve including a body having a fluid passage and an opening intersecting the passage, a tapered plug in the opening for controlling the flow through the passage, a nut threaded into an end of the opening and having shouldered engagement with the plug to shift the same longitudinally, the nut being expansible, and means for expanding the nut to resist turning of the same, the said means including a screw for expanding the nut against the wall of the opening.

12. A stop cock including, a body having a fluid passage and an opening intersecting the passage, a turnable plug in the opening for controlling the flow through the passage, a flange on the plug in the body opening, a sealing element cooperating with the inner side of the flange and the wall of the opening for sealing between the body and plug, and a nut threaded in the opening and cooperating with the outer side of the flange to force the plug in the opening.

13. A stop cock including, a body having a fluid passage and an opening intersecting the passage, a turnable plug in the opening for controlling the flow through the passage, a flange on the plug in the body opening, a head on the plug at the exterior of the body, a nut threaded in the opening between the flange and head and cooperable with the flange and the head to shift the plug longitudinally in the opening, the head having a diametric opening for receiving a tool for turning the plug and having a lubricant chamber in communication with the body opening, and a plunger operable in the chamber for forcing lubricant to the body opening.

14. A stop cock including, a body having a fluid passage and an opening intersecting the passage, a turnable plug in the opening for controlling the flow through the passage, a flange on the plug in the body opening, a head on the plug at the exterior of the body, a nut threaded in the opening between the head and flange operable to shift the plug longitudinally, the nut surrounding the plug in spaced relation thereto to leave a chamber for containing lubricant to lubricate the cooperating surfaces of the nut and head and the nut and flange, and means for supplying lubricant to the chamber.

LELAND S. HAMER.